United States Patent [19]

Frauendorf et al.

[11] Patent Number: 5,086,150
[45] Date of Patent: Feb. 4, 1992

[54] PROCESS FOR THE PRODUCTION OF PUH ELASTOMER THREADS AND FILMS RESISTANT TO LIGHT AND EXHAUST GASES AND ELASTOMER THREADS HAVING THE REQUIRED COMPOSITION

[75] Inventors: Beatrix Frauendorf, Leverkusen; Carlhans Süling, Odenthal; Hans Rudolph, Krefeld; Siegfried Korte, Odenthal, all of Fed. Rep. of Germany

[73] Assignee: Bayer Aktiengesellschaft, Leverkusen-Bayerwerk, Fed. Rep. of Germany

[21] Appl. No.: 585,959

[22] Filed: Sep. 21, 1990

[30] Foreign Application Priority Data

Oct. 3, 1989 [DE] Fed. Rep. of Germany ....... 3932958

[51] Int. Cl.$^5$ .............................................. C08G 18/30
[52] U.S. Cl. ........................................ 528/49; 528/25; 528/28; 528/45; 528/75; 521/187
[58] Field of Search .................. 528/58, 25, 28, 45, 528/73, 58, 49, 25, 28, 46, 73; 521/137, 157

[56] References Cited

U.S. PATENT DOCUMENTS

| 3,645,976 | 2/1972 | Suzuki et al. | 528/48 |
| 4,071,505 | 1/1978 | Meckel et al. | 528/49 |
| 4,098,772 | 7/1978 | Bonk et al. | 528/49 |
| 4,195,132 | 3/1980 | Sundermann | 528/48 |
| 4,820,743 | 4/1989 | Ishikawa et al. | 521/137 |
| 5,032,664 | 7/1991 | Frauendorf et al. | 528/49 |

FOREIGN PATENT DOCUMENTS

| 0155222 | 9/1985 | European Pat. Off. |
| 1955725 | 5/1970 | Fed. Rep. of Germany. |
| 2024233 | 1/1980 | United Kingdom. |

OTHER PUBLICATIONS

CELLULAR POLYMERS, 6:1; 29-36 (1987).

*Primary Examiner*—John Kight, III
*Assistant Examiner*—Duc Truong
*Attorney, Agent, or Firm*—Connolly and Hutz

[57] ABSTRACT

This invention relates to a process for the production of light resistant and exhaust gas resistant PUH elastomer threads and films based on segmented polyurethane ureas which are based on diisocyanate mixtures of from 30 to 85 mol% of trans-1,4-cyclohexylene diisocyanate and from 70 to 15 mol% of other aliphatic or cycloaliphatic diisocyanates. The diisocyanates are first reacted with relatively high molecular weight dihydroxy compounds and optionally low molecular weight diols to form an isocyanate prepolymer which is then reacted with aliphatic diamines or diamine mixtures, preferably ethylene diamine, in highly polar solvents, optionally in the presence of salt type solubilizing agents such as lithium salts and preferably with the aid of aliphatic chain terminators, in particular those having a cycloaliphatic structure, to produce elastomer solutions which are stable under processing conditions. These solutions are spun in the conventional manner or dried to form films or coagulated to form sheet products.

The invention also relates to the segmented polyurethane urea elastomers, in particular threads, obtainable by the new process.

16 Claims, No Drawings

PROCESS FOR THE PRODUCTION OF PUH ELASTOMER THREADS AND FILMS RESISTANT TO LIGHT AND EXHAUST GASES AND ELASTOMER THREADS HAVING THE REQUIRED COMPOSITION

This invention relates to a process for the production of light resistant and exhaust, gas resistant PUH elastomer threads and films based on segmented polyurethane ureas which are based on diisocyanate mixtures of from 30 to 85 mol % of trans-1,4-cyclohexylene diisocyanate and from 70 to 15 mol % of other aliphatic or cycloaliphatic diisocyanates. The diisocyanates are first reacted with relatively high molecular weight dihydroxy compounds and optionally low molecular weight diols to form an isocyanate prepolymer which is then reacted with aliphatic diamines or diamine mixtures, preferably ethylene diamine, in highly polar solvents, optionally in the presence of salt type solubilizing agents such as lithium salts and preferably with the aid of aliphatic chain terminators, in particular those having a cycloaliphatic structure, to produce elastomer solutions which are stable under processing conditions. These solutions are spun in the usual manner or dried to form films or coagulated to form sheet products.

The invention also relates to the segmented polyurethane urea elastomers, in particular threads, obtainable by the new process.

The raw materials used for elastane threads (Spandex threads) available on the market are segmented polyurethane ureas (PUH) based on macrodiols such as polyethers or polyesters and aromatic diisocyanates as well as diamine chain lengthening agents. The reactivities of these groups of compounds can be adjusted to one another as required and elastic threads with very good mechanical properties can be produced economically from the resulting segmented elastomers (see Ullmann, Volume 11, 4th Edition, pages 312 to 320). One serious disadvantage of these elastane threads in the form available on the market, however, is that due to the aromatic diisocyanates used for their production, they have little resistance to oxidizing agents, light, the action of noxious gases such as nitrogen oxides and treatment fluids containing chlorine.

It is well known that when (cyclo)aliphatic diisocyanates are used, the aliphatic urethane group-containing polyurethanes obtained undergo less discolouration (see U.S. Pat. No. 3 399 167) but are frequently very difficult or almost impossible to process on account of their insufficient solubility (see Ullmann's Encyclopedia of Industrial Chemistry, Volume A 10, Fibres, page 611) and in most cases have unsatisfactory melting/softening properties and do not give rise to sufficiently stable solutions for reliable processing, for example to form threads and films.

It is known from U.S. Pat. No. 3 377 308 to use small quantities of such aliphatic diisocyanates as chemical units which modify the synthesis of the chains by virtue of their relatively low reaction velocity compared with aromatic diisocyanates in the end stage of the chain lengthening reaction which is accompanied by the increase in viscosity.

It has also been attempted to use the better resistance to discolouration (which is known per se) of (cyclo)aliphatic diisocyanates for the synthesis of polyurethane ureas from other systems containing solvents. Thus DE-OS 1 955 725 describes an elastomeric, segmented polyurethane urea polyurethane which is synthesized from 1,4-cyclohexane diisocyanate having a trans content of at least 55% by weight (or bis-cyclohexyl diisocyanate derivatives having a trans/trans content of at least 50% by weight) and unsubstituted or methyl- or ethyl-substituted 1,4-cyclohexylene diamines having a trans content of at least 33% by weight.

These compositions containing chain lengthening agents based on 1,4-cyclohexylene-diisocyanates and -diamines have excellent light resistance and resistance to discolouration by atmospheric gases and chlorine bleaches, but the resistance of the solutions to pasting (a sort of desolvation) is extremely low so that it is virtually impossible to handle these compositions under industrial conditions for spinning to produce elastomer threads.

The solutions rapidly turn to paste in spite of the presence of up to 10% by weight of lithium chloride as solubilising agent and the presence of chain terminators of the type of N,N-dialkylaminoalkylene diamines, so that continuous spinning is not possible. Moreover, although the mechanical properties are somewhat better than those of elastomers containing 4,4'-diaminodicyclohexylmethane chain lengthening agents, the softening points are not always satisfactory and the thermal and hydrothermal properties are distinctly unsatisfactory.

GB-PS 1 110 868 describes segmented elastomers based on cycloaliphatic diisocyanates and cycloaliphatic diamines which satisfy certain steric requirements, with trans/trans contents based on certain 4,4'-dicycloalkylidene compounds, optionally monofunctional chain terminators such as diethylamine, and optionally up to 10 mol % of other diisocyanates or other diamine chain lengthening agents. Although such cycloaliphatic, segmented elastomers have good resistance to light and noxious gases and acceptable strength properties and elastic properties at room temperature and can be dissolved relatively easily to form relatively stable solutions in conventional solvents such as dimethyl formamide/dimethyl acetamide, the melting and softening ranges obtainable and the corresponding thermal and hydrothermal properties of the threads are completely unsatisfactory. The inadequacy of this elastomer composition has already been shown in the comparison example of DE-OS 1 955 725.

DE-OS 2 829 199 describes segmented elastomers in which macrodiols are reacted with 1,4-cyclohexylene diisocyanate having a trans isomer content of at least 90% and diols, aliphatic or cycloaliphatic diamines or hydrazine (derivatives) as chain lengthening agents. Although pure polyurethanes chain lengthened with butane-1,4-diol are sufficiently soluble, when attempts are made to spin them into threads they are found to be unsuitable in their thermal and hydrothermal properties for use in the elastane sector. They are preferably used as casting polyurethane elastomers. Although threads obtained from prepolymers which have been chain lengthened with hydrazine are light fast, they are sensitive to chlorine, evidently because the nitrogen/nitrogen bond is attacked by oxidation.

Attempts to carry out a chain lengthening reaction with diamines such as 1,4-diaminocyclohexane or ethylene diamine fail on account of the virtually instant pasting even of relatively dilute solutions and even in the presence of solubilizing agents such as LiCl.

Segmented polyurethane urea elastomers based on isophorone diisocyanate and diamine chain lengthening agents (see U.S. Pat. No. 3,857,809 or DDR 253 629) are much too low melting to be used for elastomer threads and due to their asymmetric structure they are soluble even in so called "soft solvents", e.g. mixtures of toluene/isopropanol.

OBJECT OF THE INVENTION

The object of the invention was therefore to provide segmented elastomers based on urea hard segments obtained from (cyclo)aliphatic compounds (i.e. (cyclo)aliphatic diisocyanates and diamines), which elastomers would be resistant to light, exhaust gases and chlorine, would be sufficiently stable in solution in highly polar solvents, in particular in dimethyl formamide and dimethyl acetamide, if necessary with the addition of solubilizing agents such as lithium salts, even when subsequently processed (spun) under technical conditions, and would have a minimum of thermal properties (melting range, thermal and hydrothermal properties) and elastic properties, including in particular elastic recovery. These and other advantages which will be clear in detail iron the description and the Examples were able to be achieved by the process according to the invention for the production of, or by the use of suitable compositions of segmented polyurethane ureas.

SUBJECT MATTER OF THE INVENTION

The invention thus relates to a process for the production of polyurethane urea elastomers which are resistant to light and noxious gases, from selected combinations of chemical units, especially threads having good elastic properties, in particular together with good thermal properties and good spinning properties obtained from sufficiently stable elastomer solutions. The invention further relates to and claims appropriate elastomer compositions obtained from certain diisocyanate mixtures and diamine chain lengthening agents or mixtures of such chain lengthening agents.

The process according to the invention relates in particular to a process for the production of segmented polyurethane urea elastomers based on relatively high molecular weight dihydroxy compounds (macrodiols), aliphatic and/or cycloaliphatic diisocyanates, diamines and chain terminators, optionally in the presence of solubilizing agents, and to their conversion into threads and films by the usual processes, characterised in that in a first stage, a) a relatively high molecular weight dihydroxy compound having molecular weights from 1,000 to 8,000, preferably from 1,500 to 4,000, e.g. polyester diols, polyether diols or mixtures thereof, b) optionally with the addition of low molecular weight dihydroxy compounds having molecular weights of from 62 to 399 (e.g. N,N-bis-(β-hydroxypropyl)-N-methylamine) in quantities of at most 15 mol %, based on a), and c) a mixture of molar excess quantities of diisocyanates (molar based on (a+b)) obtained from
  c1) trans-1,4-cyclohexylene diisocyanate in quantities amounting to 30 to 85 mol %, preferably from 50 to 80 mol %, of the diisocyanates put into the process and
  c2) from 70 to 15 mol %, most preferably from 50 to 20 mol %, of other aliphatic or cycloaliphatic diisocyanates, d) optionally in the presence of catalysts, in particular tin catalysts, are reacted e) solvent free or in solvents, preferably highly polar amide solvents such as dimethyl formamide or, in particular, dimethyl acetamide, to produce an isocyanate prepolymer having an isocyanate content (based on the solids content) of from 1 5 to 3.5%, preferably from 1.9 to 3.0%, and this isocyanate prepolymer is then reacted, optionally after dilution with highly polar solvents, with solutions of (f-g) in highly polar solvents of f) aliphatic alkylene diamines or mixtures of
  f1) at least 50 mol % of aliphatic $C_2$-$C_6$ alkylene diamines, in particular ethylene diamine, and
  f2) at most 50 mol % of other aliphatic and/or cycloaliphatic diamines and g) from 0 to 5 mol %, preferably from 0.1 to 3 mol %, of monofunctional amine chain terminators, preferably cycloaliphatic monoamines corresponding to the following general formulae

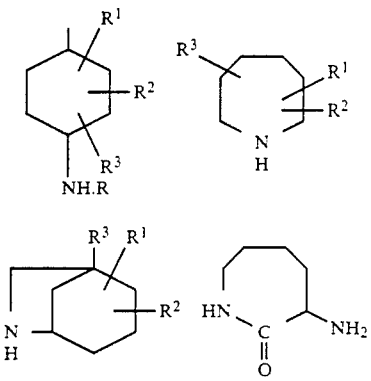

wherein
R = H, $C_1$-$C_4$ alkyl or cyclohexyl,
$R^1$, $R^2$ and $R^3$ = H or straight chain or branched chain $C_1$-$C_4$ alkyl but at least one of the groups must be alkyl, in the presence of h) salt type solubilizing agents used in quantities of from 0 to 10% by weight, preferably from 0.1 to 10% by weight, based on the polyurethane urea solids content, preferably lithium salts of inorganic acids or organic $C_1$-$C_8$ carboxylic acids, in particular lithium chloride, to produce elastomer solutions having a concentration of at least 15% by weight of solids content, preferably from 18 to 30% by weight of solids content, and the reaction product obtained is worked up by the usual methods, in particular by the dry or wet spinning process, optionally after the addition of i) conventional additives, and any solubilizing agents h) present are removed from the threads or articles produced from them by washing or extraction.

The invention further relates to threads and films, particularly threads having a segmented structure in accordance with the process described; when solubilising agents are used, the process is preferably employed for the production of threads, with removal of the solubilising agent.

The elastomer threads according to the invention should satisfy certain minimum requirements of hydrothermal and thermal properties; thus the heat distortion temperature should be at least 170° C. and the hot tearing time should be at least 7 seconds, preferably not less than 20 seconds.

The segmented polyester/polyether polyurethane urea elastomers prepared according to the invention give rise to clear spinning solutions which are very suitable for working up into threads by conventional wet spinning and especially dry spinning and have sufficient solution stability (viscosity stability). The threads have excellent resistance to discoloration and degradation under the action of light and UV and excellent colour stability in the presence of nitrogen oxides/exhaust gases from combustion and are subject to much less degradation than elastomer threads based on aromatic diisocyanates. They also have excellent thermal and hydrothermal properties; in this respect they are superior to the elastomer threads predominantly used for processing in the elastomer market, such as Dorlastan ® or Lycra ®.

Threads obtained from the composition claimed here advantageously also have less tendency to tackiness, with the result that the threads run more freely off the spools.

Production of the polyurea urethane elastomers according to the invention may be carried out by any known processes. Synthesis by the isocyanate prepolymer process has proved to be particularly satisfactory. In the first stage of this process, a relatively high molecular weight diol a) is reacted in a solvent or solvent free with a diisocyanate c), optionally in the presence of low molecular weight diols b), to form an isocyanate prepolymer, the reaction being carried out in such a manner that the isocyanate prepolymer contains a certain quantity of NCO end groups.

Polyester diols and polyether diols are particularly suitable long chain, relatively high molecular weight dihydroxy compounds a) (also referred to as macrodiols). These diols generally have molecular weights of from 1,000 to 8,000, preferably from 1,500 to 4,000.

Examples of suitable polyester diols include dicarboxylic acid polyesters of aliphatic dicarboxylic acids which may be prepared either from several diols or from several dicarboxylic acids or hydroxy carboxylic acids. Adipic acid mixed esters of adipic acid, hexane-1,6-diol and neopentyl glycol or of adipic acid, butane-1,4-diol and neopentyl glycol or of adipic acid, butane-1,4-diol/hexane-1,6-diol and neopentyl glycol (2,2-dimethyl-propane-diol-1,3)) are particularly suitable.

Polytetramethylene oxide diols and copolyethers with other ether-forming compounds such as ethylene oxide or propylene oxide are particularly suitable long chain polyether diols.

Mixtures of the above mentioned macrodiol compounds may also be used.

Other relatively high molecular weight diol compounds are known in the art and may be used, e.g. dihydroxylactone esters and dihydroxypolycarbonates.

The following are examples of low molecular weight diols b): ethylene glycol, butane-1,2-diol, butane-1,4-diol, 1,4- and/or 1,3-cyclohexane dimethanol, N,N-bis-($\beta$-hydroxypropyl)-methylamine, N,N'-bis-($\beta$-hydroxyethyl)-piperazine, N,N-dimethyl-N',N'-hydroxyethyl-dimethylhydrazine and others belonging to this class of compounds.

The diisocyanate c) used according to the invention is a diisocyanate mixture containing, as component c1), trans-1,4-cyclohexylene diisocyanate in quantities of from 30 to 85 mol %, preferably from 50 to 80 mol %, based on the total molar quantity of diisocyanates in the mixture. It has been found that a minimum quantity of this trans isomer of 1,4-cyclohexylene diisocyanate is necessary in order to achieve an improvement, in particular of the thermal and hydrothermal properties. If this quantity is increased, however, the solutions of such elastomers become too unstable and paste too rapidly for technical use.

The compounds used as components c2) are aliphatic and/or cycloaliphatic diisocyanates with less symmetry and rigidity than c1).

Specific examples of these compounds c2) include 1,6-hexamethylene diisocyanate, 1,8-octamethylene diisocyanate, 2/3-methyl-hexamethylene-1,6-diisocyanate, 2,4-diisocyanato-1-methyl-cyclohexane and the 4,4'-dicyclohexylmethane-, 4,4'-dicyclohexylalkylidene- and 4,4'-dicyclohexylether-diisocyanates in their various stereoisomeric forms or steroisomeric mixtures.

When aliphatic or cycloaliphatic diisocyanates having more than two alkyl or alkylene side chains are used (e.g. isophorone diisocyanate), their quantity is limited to less than 15 mol %, preferably less than 10 mol %, as they would otherwise cause too sharp a reduction in the thermal and hydrothermal properties.

In the synthesis of the segmented elastomers by the isocyanate prepolymer process, the macrodiols are reacted in such a manner, either solvent free or in a solvent, with molar quantities of ediisocyantes c) which are in excess of the diols (a+b) that the reaction product contains isocyanate end groups. The OH/NCO ratios chosen are preferably from 1:1.4 to 1:2.5, more preferably from 1:1.6 to 1:2.1, so that the isocyanate prepolymers obtained have an NCO content of from 1.5 to about 3.5% by weight, preferably from 2.3 to 3.1% by weight of NCO.

If solvents are to be used for the prepolymerisation reaction, chlorobenzene is suitable for this purpose but highly polar solvents such as N-methylpyrrolidone or dimethylsulphoxide are preferred and the highly polar amide solvents, dimethyl formamide and dimethyl acetamide, which are most commonly used as spinning solvents, are particularly preferred.

The higher the NCO content of the prepolymer, the better are the thermal and hydrothermal properties of the elastomers produced from the prepolymers since the NCO content controls the proportion of hard segments in the elastomers. The higher the proportion of hard segments, however, the greater is the tendency of the elastomer solutions to become pasty, owing to their insufficient capacity for solvation.

The preparation of prepolymers is frequently tedious on account of the relatively inert aliphatic diisocyanate groups. Catalysts may be used in quantities of from 0 to 1% by weight, preferably from 0.002 to 0.5% by weight. It has been found that the reaction velocity can be increased to such an extent by the addition of catalysts d) that process conditions acceptable on economical grounds can be obtained. It is generally not customary to use catalysts for the preparation of (elastane)-PUH elastomers or spinning solutions because under the known conditions and with the systems hitherto known, the presence of catalysts encourages the formation of gel or swelling bodies in the case of polyurethane ureas due to branching or cross-linking. It was therefore surprising to find that such disadvantages do not occur in the process according to the invention and on the contrary the process proceeds smoothly in the presence of catalysts if the isocyanate prepolymer synthesis is carried out in solution.

The following catalysts are suitable: Lewis acid catalysts such as tin salts or, for example, organo tin compounds such as organo tin carboxylates or halides, dibutyl tin dilaurate, inorganic salts of inorganic acids, e.g. tin octoate, tin stearate, tin acetate or lead octoate, insertion catalysts such as organo tin alcoholates, β-dicarbonyl compounds, oxides, mercaptides or sulphides, organo-amine tin compounds and organo-phosphine tin compounds. Basic Lewis catalysts such as tertiary amines, phosphines and pyridines such as those known in the art for the preparation of polyurethanes are also suitable. Dibutyl tin dilaurate (Desmorapid® Z/Bayer AG) and diazobicyclooctane (DABCO®) are preferred catalysts.

For the synthesis of the segmented polyurethane ureas, the required urea groups are introduced into the macromolecules by a chain lengthening reaction of the isocyanate prepolymers with diamines. The isocyanate prepolymers (also known as macrodiisocyanates) synthesized at the isocyanate prepolymer stage are reacted with chain lengthening agents f), preferably aliphatic diamines, optionally chain terminators h) and optionally solubilizing agents g) in highly polar solvents. The solubility and capacity for crystallization as well as the melting range of the hard segments are optimally adjusted by suitable choice of the chain lengthening agents. Whereas the use of rigid diamines containing cyclohexylene groups (e.g. 1,4-diaminocyclohexane) gives rise to solutions which are difficult to work up and rapidly paste, the diamine mixtures to be used according to the invention are very suitable. The diamines f) used are preferably straight chain or branched chain $C_{2-C_6}$ diamines, either alone or in a predominant quantity ($\geq$50 mol %), e.g. 1,2-propylene diamine, 1,4-diaminobutane, 1,6-diaminohexane or 1,3-diamino-2,2-dimethylpropane, but ethylene diamine is preferably used as either the only or the predominant chain lengthening agent.

When diamine mixtures are used, alkylene diamine, in particular ethylene diamine, are preferably used as the predominant chain lengthening agents together with (up to a maximum of 50 mol %, preferably not more than 30 mol %) asymmetric diamines (e.g. 1,2-propylene diamine, 1,3-diaminobutane, 1,3-diaminocyclohexane (cis and/or trans), 2,4-diamino-1-methyl-cyclohexane and similar diamines). When isophorone diamine (which has a very asymmetric structure) is also used, it should be incorporated in quantities of less than 10 mol %, preferably less than 5 mol %, because the hydrothermal and thermal properties would otherwise be too greatly reduced. At the same time, even such small quantities of isophorone diamine provide significant improvements in the solubility.

Secondary amines such as piperazine, N-methyl-ethylene diamine or N,N'-dimethyl-ethylene diamine may also be used as co-diamines, but this is less preferred.

The chain lengthening reaction is preferably carried out in solution in highly polar solvents such as dimethyl sulphoxide or N-methyl pyrrolidone but preferably in dimethyl formamide or particularly in dimethyl acetamide.

The reaction is advantageously carried out in the presence of solubilizing agents h) which consist of certain salts such as potassium cyanate, ammoniumthiocyanate, calcium nitrate, calcium chloride or zinc chloride. Lithium salts of inorganic or organic acids are preferred, e.g. lithium formate, lithium acetate, lithium thiocyanate, lithium trimethyl acetate or lithium bromide, but especially lithium chloride.

The molecular weight may be adjusted to the required value by using a small quantity of monofunctional chain terminators, e.g. monoamines, during the chain lengthening reaction. It was found, completely unexpectedly, that in contrast to the usual monoamines such as diethylamine or dibutylamine or asymmetric dimethyl hydrazines used according to the state of the art, amino chain terminators carrying cycloaliphatic groups as represented by the following general formulae

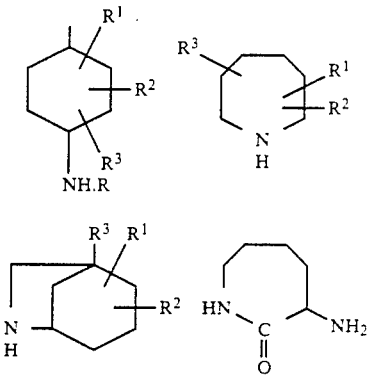

wherein
R=H, $C_1$ to $C_4$ alkyl or cyclohexyl and $R^1$, $R^2$, $R^3$=H or straight chain or branched chain $C_1$ to $C_4$ alkyl but at least one of the groups must be alkyl when R is not alkyl or cycloalkyl give rise to elastomer solutions with dramatically improved solubility (reduced tendency to pasting) and better flow and such spinning solutions remain in a suitable state for technical processing for a sufficient length of time.

Such preferred chain terminators even enable the quantity of solubilizing agent (e.g. lithium chloride) to be substantially reduced without risk of premature pasting. The following may be particularly mentioned among the aforesaid preferred chain terminators: dicyclonexylamine, cyclohexyl-N-methylamine, N-cyclohexyl-N-(3-methylcyclohexyl) amine, 1-amino-3-ethyl-cyclohexane, 1-amino-3-methyl-cyclohexane, 1-amino-3,3,5-trimethylcyclohexane, 1-amino-3-methyl-cyclohexane, 1-amino-3-isopropyl-cyclohexane, 3,3,5-trimethyl- 1-azacycloheptane (TMD-imine), α-aminocaprolactam and an amine corresponding to the following formula

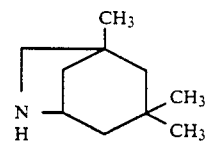

Such a procedure using the preferred chain terminators is therefore of particular technical interest.

The elastomer solution used for the preferred dry spinning process is generally required to have a viscosity of from 30 to 120 Pa.s at 20° C. and the concentration of the spinning solution may be from 18 to 34% by weight. For the dry spinning process, spinning solutions having viscosities of at least 30 Pa.s at 20° C. and optionally heated to about 120° C. are spun through spinning dies into a spinning shaft about 4 to 8 meters in length, heated to about 150° to 250° C. while air or an inert gas such as nitrogen heated to about 150° to 350° C. is injected into the shaft.

The solutions should be stable to pasting for at least 24 hours, preferably for not less than 3 days.

More dilute solutions are suitable for wet spinning processes. These solutions should also be resistant to pasting for the above mentioned minimum length of time.

Effective quantities of additives for various purposes may be added to the elastomer solutions prepared according to the invention. The following are examples of such additives: antioxidants, light protective agents, UV absorbents, brightening or shading dye stuffs, pigments, colouring additives (e.g. oligomers or polymers containing tertiary amines), antistatic agents, abusive additives such as magnesium, calcium, lithium, zinc or aluminium salts of long chain carboxylic acids such as stearic or palmitic acid or dimeric fatty acids or any mixtures of these salts. Zinc oxide containing up to 5% by weight of other oxides or carbonates such as MgO, MgCO$_3$ or CaCO$_3$ may also be added.

The elastomer solutions obtained by the process according to the invention may be spun into elastomer threads by the processes indicated but may also be worked up into film coatings or similar sheet products by drying or by coagulation. The presence of the salts may cause microporous coagulation (films with permeability to water vapour), depending on the method employed. If the product contains solubilizing agents in the form of salts, the latter may be removed by subsequent washing. In a wet spinning process, the treatment by coagulation and washing baths is generally sufficient to remove the salts (which may be recovered from the wash bath). In dry spinning processes, these solubilizing agents initially remain in the thread. Since these salts sometimes alters the secondary valency forces between the molecule chains, their presence may cause softening or reduction in thermal resistance. The solubilizing agent should therefore be removed from the threads at suitable stages, either on the spools or in the fabric or in the process of finishing the fabric.

The same applies to the determination of properties of the thread. Whereas wet spun threads generally undergo no after-treatment, threads produced by dry spinning are freed from salts by immersion in water and dried before the properties are determined.

The elastomers according to the invention (threads or films) have an unusual combination of outstanding fastness to light and exhaust gases and excellent thermal and hydrothermal properties. The hydrothermal and thermal properties (e.g. their heat distortion temperature) are considerably better, in spite of the aliphatic structure, than the properties of elastane/spandex threads available on the market. They are highly interesting starting materials by virtue of their unusual combination of good thermal/hydrothermal properties and excellent resistance to light and noxious gases. The aliphatically/cycloaliphatically based threads having the composition according to the invention also show considerable improvements in elastic properties compared with those of other elastic threads based on cycloaliphatic/aliphatic compounds, in particular they have good elastic recovery.

Methods of measurement

The quantities mentioned in the examples were determined as follows: the inherent viscosity of the elastomers was determined in a dilute solution of 0.5 g/100 ml of dimethyl acetamide at 30° C. by measuring the relative viscosity $\eta_r$ compared with the pure solvent and converting the result in accordance with the following formula:

$$\eta_R = \frac{t_1}{t_0}$$

$t_1$: throughflow time (sec) of the polymer solution
$t_0$: throughflow time (sec) of the pure solvent $$\eta_i = \frac{\ln \eta_r}{c}$$

The breaking length was determined according to DIN 53 815 (c/Ndtex). The breaking elongation (in %) was also determined according to DIN 53 815. The modulus at 100% and at 300% for the first elongation was determined in cN/dtex at a speed of elongation of $4 \times 10^{-3}$ meter per second. The residual elongation was determined after the elastomer had been stretched five times by 300% followed by a recovery time of 60 seconds. The heat distortion temperature (HDT) and heat breaking time (HRZ=Heissreisszeit) were carried out by methods described in Chemiefasern/Textilindustrie, January 1978, Volume 1/78, 28/year 80, on pages 44 to 49. Similar information is also given in DE-OS 2 542 500 (1975).

The light fastness was tested by the Fadeometer test after an exposure time of 22 and 132 hours.

The experiments to test resistance to noxious gases were carried out as follows:

The threads were made up into knitted tubes washed for two hours in petroleum ether at room temperature and tested for resistance to nitrogen oxides at an elevated temperature.

In accordance with ISO standard 105-GO2, the test samples were placed for this purpose on a rotatable frame introduced into a chamber heated to 60° C. into which a mixture of NO$_2$ gas and air was injected to produce an NO$_2$ concentration of 600 ppm in the chamber.

The samples were kept in motion in this noxious gas atmosphere for 90 minutes by rotation of the frame (50 revs per min). They were then removed, washed with a 1.3% solution of urea to free them from NO$_2$ adhering to them, and dried in air.

The noxious gases are understood to be in particular nitrogen oxides and exhaust gases of combustion.

EXAMPLE 1 (Comparison Example)

508.9 g of a polyester diol based on adipic acid, hexane1,6-diol and neopentyl glycol (molar ratio 65:35) and having an OH number of 56.28 (molecular weight about 1990) were mixed with 147.2 g of dimethyl acetamide and to this mixture were added 79.8 g of hexamethylene-1,6-diisocyanate and 0.5 ml of dibutyl tin dilaurate. The reaction mixture was then heated to 50°–55° C. for 40 minutes until the isocyanate content of the isocyanate prepolymer was 2.86% by weight (based on the prepolymer solids content).

A mixture of 10.56 g of ethylene diamine and 1739.3 g of 2.8% lithium chloride solution in dimethyl acetamide was prepared and heated to 50° C. 600 g of the isocyanate prepolymer were added to this mixture within 15 minutes with intensive stirring. A clear, homogeneous elastomer solution having an elastomer solids content of 21% by weight was obtained. It contained 9.97% by weight of lithium chloride based on 100% by weight of elastomer solids content and had a solution viscosity of 164.3 Pa.s (at 20° C.). The inherent viscosity was 1.09 dl/g (5 g of elastomer solids per liter of dimethyl acetamide at 30° C.). 0.3% by weight of magnesium stearate and 1% of a polyether siloxane known as Silwet ®, a polyether/polydimethyl siloxane copolymer supplied by Union Carbide, were added to the viscous elastomer solution, the percentages being based on the PUH solids content.

Spinning was carried out by the dry spinning process under the following conditions:

Temperature of shaft: 200° C.
Air temperature: 265° C.
Spinning die: 16 aperture, diameter 0.2 mm
Temperature of spinning head: 80° C.
Air spiralling nozzle: 0.6 bar
Take off from godet wheels 1, 2, 3: 260/310/310 m/min Properties of thread (washed; the threads to be tested were washed in water at room temperature for 12 hours and carefully dried at 40° C.).

Titer: 158 dtex
Breaking length: 0.69 cN/dtex (DIN 53 815)
Elongation at maximum breaking force: 482% (DIN 53 815)
Modulus 100% (at first elongation): 0.038 cN/dtex
Modulus 300%: 0.125 cN/dtex
Heat distortion temperature (HDT): 166° C.
Residual elongation: 18%
Hot breaking time (HRZ = Heissreisszeit): breaks immediately
Softening/melting range (Koflerbench after 30 sec.): 160° C.

See also elastic data in Table 1.

EXAMPLE 2

144.1 g of dimethyl acetamide, 27.9 g of trans-1,4-cyclohexylene diisocyanate (35.4 mol %), 51.6 g of 1,6-hexamethylene diisocyanate (64.6 mol %) and 0.5 ml of Desmorapid ® Z were added to 496.9 g of the polyester diol described in Example 1.

The reaction mixture was then heated to 50°-55° C. for 65 minutes until the NCO content of the isocyanate prepolymer solution was 3.092%.

A mixture of 11.40 g of ethylene diamine and 1619 g of 3% lithium chloride solution in dimethyl acetamide was prepared and heated to 50° C. 600 g of the isocyanate prepolymer solution were added within 15 minutes to this mixture with intensive stirring. A clear, homogeneous elastomer solution having an elastomer solids content of 22% by weight was obtained. It contained 9.88% by weight of lithium chloride at an elastomer solids content of 100 and had a solution viscosity of 169.5 Pa.s at 20° C. The inherent viscosity was 1.26 dl/g. The stability of the solution is ensured for at least two days.

0.3% by weight of magnesium stearate and 1% of the polyester siloxanes known as Silwet ®, based on the PUH solids content, were added to the viscous solution. Spinning was carried out by the dry process as described in Example 1.

Properties of thread—washed as in Example 1—

Titer: 150 dtex
Breaking length: 0.77 cN/dtex
Elongation at maximum tension: 492%
Modulus 100%: 0.030 cN/dtex
Modulus 300%: 0.116 cN/dtex
HDT: 177.5° C.
Residual elongation: 11%
Hot breaking time: 7 sec.

See also elastic properties in Table 1.

EXAMPLE 3

146.9 g of dimethyl acetamide, 51.25 g of trans-1,4-cyclohexylene diisocyanate (65 mol %), 27.93 g of 1,6-hexamethylene diisocyanate (35 mol %) and 0.5 ml of Desmorapid ® solution were added to 508.5 g of the polyester described in Example 1. The reaction mixture was then heated to 50°-55° C. for 75 minutes until the NCO content of the isocyanate prepolymer solution was 2.18%.

A mixture of 10.03 g of ethylene diamine and 1737 g of a 2.8% solution of lithium chloride in dimethyl acetamide was heated to 50° C. and 600 g of isocyanate prepolymer were added within 15 minutes with stirring. A clear, homogeneous elastomer solution having an elastomer solids content of 21% by weight, containing 9.9% by weight of lithium chloride, based on the elastomer, and having a solution viscosity of 101.4 Pa.s was obtained. The inherent viscosity of the elastomer substance was 1.06 dl/g in dimethyl acetamide. Spinning was carried out by the dry spinning process described in Example 1. The solution was found to be stable without pasting for at least two days.

Properties of thread (washed)

Titer: 154 dtex
Breaking length: 0.72 cN/dtex
Elongation at maximum tension: 517%
Modulus 100%: 0.033 cN/dtex
Modulus 300%: 0.123 cN/dtex
HDT: 182° C.
Residual elongation: 16%
Hot breaking time: 21 sec.

See also elastic properties in Table 1.

EXAMPLE 4 (COMPARISON EXAMPLE TO EXAMPLES 5 AND 6)

264.2 g of dimethyl acetamide, 116.6 g of dicyclohexyl methane-4,4'-diisocyanate (isomeric mixture of 41.9% trans/trans, 40.06% cis/trans and 18.03% cis/cis) and 0.5 ml of Desmorapid ® Z were added to 500 g of the polyester diol described in Example 1. The prepolymer solution (solids content 70% by weight) was heated to 85°-90° C. for 60 minutes until the NCO content of the prepolymer was 2.51%.

A mixture of 13.7 g of tetramethylene diamine (TMDA), 0.4 g of N-methylamino-cyclohexane (corresponding to 1 equivalent% of TMDA) and 1577 g of a 3% by weight solution of LiCl in dimethyl acetamide was prepared and heated to 50° C. 700 g of the isocyanate prepolymer solution were added to the mixture within 15 minutes with intensive stirring. A clear, homogenous elastomer solution having an elastomer solids content of 22% by weight, containing 9.39% by weight of LiCl, based on 100% of elastomer solids content, and having a solution viscosity of 131.1 Pa.s (at 20° C.) and an inherent viscosity of 0.97 dl/g was obtained. The polymer solution was dry spun. The polymer solution remained stable in its viscosity and homogeneous for one month.

Properties of thread (unwashed)

Titer: 203 dtex
Breaking length: 0.65 cN/dtex
Elongation at maximum tension: 518%
Modulus 100%: 0.033 cN/dtex Modulus 300%: 0.096 cN/dtex
HDT: 168° C.
Residual elongation: 23%
HRZ (hot breaking time): breaks immediately
Softening/melting range (Koflerbench after 30 seconds): 180° C.
See further elastic data in Table 1.

EXAMPLE 5

47.9 g of dimethyl acetamide, 51.25 g of trans-1,4-cyclohexylene diisocyanate (65 mol %) and 43.60 g of dicyclohexylmethane-4,4'-diisocyanate (14.7 mol % trans/trans, 14 mol % cis/trans and 6.3 mol % cis/cis isomers) and 0.5 ml of Desmorapid ® Z were added to 496.9 g of the polyester described in Example 1. The reaction mixture was then heated to 50° C. for 40 minutes until the NCO content of the prepolymer was 2.31%.

A mixture of 10.65 g of ethylene diamine and 1620 g of 3% by weight lithium chloride solution in dimethyl acetamide was prepared and 600 g of isocyanate prepolymer solution were slowly introduced into this mixture.

A clear, homogeneous solution having an elastomer solids content of 22% by weight and containing 9.9% by weight of lithium chloride, based on the elastomer solids content and having a solution viscosity of 244.9 Pa.s/20° C. was obtained. The inherent viscosity of the elastomer was 0.94 dl/g in dimethyl acetamide. The solution was still stable and flowable after two days. Spinning was carried out by the dry spinning process as in Example 1.
Properties of thread (washed)
Titer: 169 dtex
Breaking length: 0.7 cN/dtex
Elongation at maximum tension: 509%
Modulus 100%: 0.035 cN/dtex Modulus 300%: 0.129 cN/dtex
HDT: 189° C.
Residual elongation: 22%
HRZ: 7 sec.
Other elastic properties are shown in Table 1.

EXAMPLE 6

251.4 g of dimethyl acetamide, 51.72 g of trans-1,4-cyclohexylene diisocyanate (70 mol %) and 34.98 g of trans,transdicyclohexylmethane-4,4'-diisocyanate (30 mol %) were added to 500 g of the polyester diol described in Example 1. The reaction mixture was then heated to 90° C. for 60 minutes until the NCO content of the prepolymer was 2.59%. The solids content of the prepolymer solution was 70% by weight.

A mixture of 14.2 g of tetramethylene diamine (TMDA), 0.37 g of N-methylamino-cyclohexane (corresponding to 1 equivalent% of TMDA) and 1578.9 g of a 3% by weight solution of LiCl in dimethyl acetamide was prepared and heated to 50° C. 700 g of the isocyanate prepolymer solution were added to this mixture within 15 minutes with intensive stirring.

A clear, homogeneous elastomer solution having an elastomer solids content of 22% by weight, containing 9.39% by weight of LiCl, based on the elastomer solids content, and having a solution viscosity of 47.7 Pa.s (20° C.) and an inherent viscosity of 1.06 dl/g was obtained. The polymer solution was dry spun without any further additives. The solution remained stable in its viscosity and homogeneity for one month.
Properties of thread (washed)
Titer: 231 dtex
Breaking length: 0.59 cN/dtex
Elongation at maximum tension: 488%
Modulus 100%: 0.034 cN/dtex
Modulus 300%: 0.103 cN/dtex
HDT: 170° C.
Residual elongation: 22%
HRZ: 12 sec.
Softening/melting range (Koflerbench after 30 sec.): 220° C.
For further elastic data, see Table 1.

COMPARISON EXAMPLE 7 (COMPARISON EXAMPLE TO EXAMPLES 8, 9 AND 10)

142 g of dimethyl acetamide, 74.91 g of trans-1,4-cyclohexylene diisocyanate (95 mol %), 3.94 g of cis-1,4-cyclohexylene diisocyanate (5 mol %) and 0.5 ml of Desmorapid ® Z were added to 489 g of the polyester described in Example 1. The reaction mixture was then heated to 50° C. for 7 hours until the NCO content of the prepolymer was 2.58%.

A mixture of 9.87 g of ethylene diamine and 1617 g of a 3% by weight solution of lithium chloride in dimethyl acetamide was prepared and 600 g of the isocyanate prepolymer solution were slowly introduced into this mixture at room temperature. A clear, homogeneous solution having an elastomer solids content of 22% by weight and containing 9.9% by weight of lithium chloride, based on the elastomer solids content, and having a solution viscosity of 80.1 Pa.s/20° C. was obtained. The inherent viscosity was 0.91 gl/g in dimethyl acetamide. Spinning was carried out by the dry spinning process. The elastomer solution was pasted after 6 hours.
Properties of thread (washed)
Titer: 141 dtex
Breaking length: 0.60 cN/dtex
Elongation at maximum tension: 460%
Modulus 100%: 0.044 cN/dtex
Modulus 300%: 0.210 cN/dtex
HDT: 185° C.
Residual elongation: 22%
HRZ: 20 sec.
Softening/melting range (Koflerbench after 30 sec.: 180° C.
For further elastic data, see Table 1.

Although good thermal and hydrothermal properties can be obtained in this comparison experiment based on 95% of trans- and 5% of cis-1,4-cyclohexane diisocyanate, the stability of the elastomer solution against pasting of only 6 hours is much too short (time of stability of solution too short) to enable the product to be used for industrial processes.

EXAMPLE 8

143.9 g of dimethyl acetamide, 67.10 g of trans-1,4-cyclohexylene diisocyanate (85 mol %), 11.75 g of cis-cyclohexylene diisocyanate (15 mol %) and 0.5 ml of Desmorapid ® Z were added to 496.9 g of the polyester according to Example 1. The reaction mixture was then heated to 50° C. for 40 minutes until the NCO content of the isocyanate prepolymer solution was 2.41%.

A mixture of 11.11 g of ethylene diamine and 1741 g of a 3% solution of lithium chloride in dimethyl acetamide was prepared and 600 g of isocyanate prepolymer solution were added to this mixture at room temperature with intensive stirring. A clear, homogeneous elastomer solution (containing 9.9% by weight of lithium chloride, based on the solids content) having an elastomer solids content of 20.9% and a solution viscosity of 47.7 Pa.s/20° C. was obtained. The inherent viscosity was 1.08 dl/g. The solution remained stable and spinnable for two days.

Properties of thread (washed)
  Titer: 198 dtex
  Breaking length: 0.7 cN/dtex
  Elongation at maximum tension: 380%
  Modulus 100%: 0.047 cN/dtex
  Modulus 300%: 0.347 cN/dtex
  HDT: 200° C.
  Residual elongation: 20%
  HRZ: 55 sec.

For further elastic properties, see Table 1.

The filament yarns manifest a markedly reduced tendency to stick and can therefore be easily unwound from the spool without the inclusion of auxiliaries such as magnesium stearate.

EXAMPLE 9

143.9 g of dimethyl acetamide, 55.2 g of trans-1,4-cyclohexylene diisocyanate (70 mol %), 23.66 g (30 mol %) of cis-1,4-cyclohexylene diisocyanate and 0.5 ml of Desmorapid ® Z were added to 496.9 g of the polyester described in Example 1. The reaction mixture was then heated to 50° C. for 50 minutes until the NCO content of the prepolymer was 2.40%.

A mixture of 11.07 g of ethylene diamine and 1621 g of a 3% solution of lithium chloride in dimethyl acetamide was prepared and 600 g of prepolymer were added to this mixture. A clear, homogeneous spinning solution containing 9.9% by weight of lithium chloride, based on the elastomer solids content, and having a solution viscosity of 306.3 Pa.s/20° C. and an inherent viscosity of 1.06 dl/g was obtained. The solution was stable for two days. Spinning was carried out by the dry spinning process as described in Example 2.

Properties of thread (washed)
  Titer: 132 dtex
  Breaking length: 0.7 cN/dtex
  Elongation at maximum tension: 470%
  Modulus 100%: 0.042 cN/dtex
  Modulus 300%: 0.203 cN/dtex
  HDT: 194° C.
  Residual elongation: 17%
  HRZ: 44 sec.
  Softening/melting range (Koflerbench after 30 min): 250° C.

Further elastic properties are listed in Table 1.

EXAMPLE 10

50 g of trans-1,4-cyclohexylene diisocyanate (67.7 mol %) and 23.85 g of cis-1,4-cyclohexylene diisocyanate (32.3 mol %) were added to 500 g of the polyester described in Example 1. The reaction mixture was then heated to 50° C. for 20 hours until the NCO content of the prepolymer melt was 2.38% by weight. The prepolymer melt was diluted to a solids content of 60% by weight with 380 g of dimethyl acetamide.

A mixture of 7.67 g of ethylene diamine (EDA), 0.29 g of N-methylcyclohexylamine (corresponding to 1 amine equivalent% of EDA) and )555.5 g of a 2.7% solution of lithium chloride in dimethyl acetamide was prepared. 700 g of the isocyanate prepolymer solution were added to this mixture at room temperature. A clear, homogeneous spinning solution containing 9.8% by weight of lithium chloride, based on the elastomer solids content, and having a solution viscosity of 96.6 Pa.s/20° C. and an inherent viscosity of 1.42 dl/g was obtained. The solution was stable for one week. It was spun by dry spinning.

Properties of thread (washed)
  Titer: 156 dtex
  Breaking length: 0.64 cN/dtex
  Elongation at maximum tension: 466%
  Modulus 100%: 0.043 cN/dtex
  Modulus 300%: 0.164 cN/dtex
  HDT: 188° C.
  Residual elongation: 11%
  HRZ: 22 sec.
  Softening/melting range (Kofler bench after 30 sec.): 220° C.

Further elastic properties are listed in Table 1.

EXAMPLE 11 (COMPARISON EXAMPLE TO EXAMPLE 12)

138.6 g of dimethyl acetamide and 46.4 g of diphenylmethane4,4'-diisocyanate (MDI) were added to 200 g of the polyester described in Example 1. The prepolymer solution (64% by weight solids content) was heated to 40°–50° C. for 60 minutes until the NCO content of the prepolymer was 2.51%.

A mixture of 195.4 g of dimethyl acetamide and 1.26 g of ethylene diamine was prepared and 6 g of $CO_2$ were added thereto. 100 g of the isocyanate prepolymer solution were added to this carbamate suspension within 15 minutes with intensive stirring.

A clear, homogeneous elastomer solution having an elastomer solids content of 22% by weight, a solution viscosity of 24.9 Pa.s (20° C.) and an inherent viscosity of 1.24 dl/g was obtained. The polymer solution was then wet spun under the following conditions without any further additives:

Spinning die: 20 aperture, diameter 0.12 mm
  Pump: 0.3 ml per revolution
  Die filter: 9000 M/cm²
  Precipitation bath: dimethyl formamide/$H_2O$=4/6
  Temperature of precipitation bath: 75° C.
  Length of precipitation bath: 2.80 m
  Draw off of winding basket 6 m/min, temperature of basket 80° C.
  Draw off of godet roller: 7.5 m/min Properties of thread
  Titer: 187 dtex
  Breaking length: 0.73 cN/dtex Elongation at maximum tension: 511%
  Modulus 100%: 0.056 cN/dtex
  Modulus 300%: 0.170 cN/dtex
  Residual elongation: 27%
  HRZ: 26 sec.

As may be seen from the list of properties of the thread, the thermal data and residual elongation in particular of the comparison threads are inferior to those of the threads according to the invention described in Example 12.

EXAMPLE 12

100 g of the polyester diol described in Example 1 were mixed with 9.99 g of trans-1,4-cyclohexane diisocyanate (67.6 mol %) and 4.77 g of cis-1,4-cyclohexane diisocyanate (32.4 mol %). The mixture was melted at 80° C. and heated to 100° C. for 18 hours until the NCO content of the prepolymer melt was 2.25%. The prepolymer melt was diluted to a solids content of 60% by weight with 76.5 g of dimethyl acetamide.

A mixture of 1·03 g of ethylene diamine, 0·04 g of N-methylcyclohexylamine (corresponding to 1 volumetric equivalent% of ethylene diamine) and 176·5 g of a 3% by weight solution of LiCl in dimethyl acetamide was prepared. 100 g of the isocyanate prepolymer solution were added to this mixture within 15 minutes at room temperature with intensive stirring. A clear, homogeneous elastomer solution having an elastomer solids content of 22% by weight and containing 8·67% by weight of LiCl, based on the elastomer solids content, and having a solution viscosity of 28·6 Pa.s (20° C.) and an inherent viscosity of 1·08 dl/g was obtained. The polymer solution was wet spun without further additives.

Properties of the thread (unwashed)
Titer: 183 dtex
Breaking length: 0·48 cN/dtex
Elongation at maximum tension: 546%
Modulus 100%: 0·055 cN/dtex
Modulus 300%: 0·171 cN/dtex
Residual elongation: 15%
HDT: 195° C.
HRZ: 73 sec.

The ratios shown in Table 1 are defined as follows:

| | |
|---|---|
| Linearity ratio: 5.B.150/5.B.300 | Uptake of force at fifth application of load and 150% elongation to uptake of force at fifth application of load and 300% elongation in the elongation pendulum experiment. |
| Relaxation ratio: E.300/B.300 | After five elongation cycles to 300% elongation: uptake of force after sixth elongation to 300% and a dwell time of 60 sec. (release of load at 300%) to uptake of force after sixth application of load at 300% elongation. |
| Fatigue ratio: 5.B.300/1.B.300 | Uptake of force at fifth application of load and 300% elongation to uptake of force at first application of load and 300% elongation. |
| Fatigue ratio: 5.B.150/1.B.150 | Uptake of force at fifth application of load and 150% elongation to uptake of force at first application of load and 150% elongation. |
| Fatigue ratio: 5.B.50/1.B.50 | Uptake of force at fifth application of load and 50% elongation to uptake of force at first application of load and 50% elongation. |
| Hysteresis ratio: 5.E.150/5.B.150 | Uptake of force at fifth release from load and 150% elongation to uptake of force at fifth application of load and 150% elongation. |
| Hysteresis ratio: 5.E.150/1.B.150 | Uptake of force at fifth release from load and 150% elongation to uptake of force at first application of load and 150% elongation. |
| Hysteresis ratio: 5.E.50/5.B.50 | Uptake of force at fifth release from load and 50% elongation to uptake of force at fifth application of load and 50% elongation. |
| Hysteresis ratio: 5.E.50/1.B.50 | Uptake of force at fifth release from load and 50% elongation to uptake of force at first application of load and 50% elongation. |

The higher the above mentioned ratios, the better are the elastic properties.

Table 1 demonstrates that the elastanes claimed in this Patent have better elastic properties than the comparison elastanes.

TABLE 1

| | Elastic properties of the elastane threads described | | | | | | | | | |
|---|---|---|---|---|---|---|---|---|---|---|
| | Ex. 1 (Comp. to Ex. 2 + 3) | Ex. 2 | Ex. 3 | Ex. 4 (comp. to Ex. 5 + 6) | Ex. 5 | Ex. 6 | Ex. 7 (Comp. to Ex. 8, 9, 10) | Ex. 8 | Ex. 9 | Ex. 10 |
| Linearity ratio 5.B.150/5.B.300 | 0.23 | 0.26 | 0.28 | 0.32 | 0.25 | 0.30 | 0.17 | 0.13 | 0.18 | 0.21 |
| Relaxation ratio E.300/B.300 | 0.75 | 0.74 | 0.71 | 0.66 | 0.65 | 0.68 | 0.66 | 0.65 | 0.69 | 0.69 |
| Fatigue ratio 5.B.300/1.B.300 | 0.85 | 0.75 | 0.79 | 0.62 | 0.66 | 0.67 | 0.68 | 0.65 | 0.66 | 0.67 |
| Fatigue ratio 5.B.150/1.B.150 | 0.46 | 0.54 | 0.55 | 0.48 | 0.43 | 0.48 | 0.54 | 0.33 | 0.38 | 0.37 |
| Fatigue ratio 5.B.50/1.B.50 | 0.45 | 0.59 | 0.50 | 0.38 | 0.43 | 0.40 | 0.38 | 0.40 | 0.43 | 0.42 |
| Hysteresis ratio 5.E.150/5.B.150 | 0.71 | 0.76 | 0.62 | 0.63 | 0.70 | 0.70 | 0.50 | 0.74 | 0.75 | 0.73 |
| Hysteresis ratio 5.E.150/1.B.150 | 0.33 | 0.41 | 0.34 | 0.30 | 0.30 | 0.33 | 0.17 | 0.25 | 0.29 | 0.27 |
| Hysteresis ratio 5.E.50/5.B.50 | 0.67 | 0.70 | 0.56 | 0.38 | 0.44 | 0.50 | 0.56 | 0.50 | 0.60 | 0.70 |
| Hysteresis ratio 5.E.50/1.B.50 | 0.30 | 0.41 | 0.28 | 0.14 | 0.19 | 0.20 | 0.21 | 0.20 | 0.26 | 0.29 |

Assessment of the Light Fastness in the Fadeometer Test

A knitted hose was produced from the unstabilized elastane as described in Example 10 and then washed in petroleum ether for two hours at room temperature and subjected to a test for light fastness. In addition, the material was subjected to various brightening processes and exposed to light in the fadeometer for 22 hours and 132 hours. The aliphatic elastane treated as described above was compared with an unstabilized polyurethane urea elastane based on the aromatic diisocyanate MDI (prepared as described in Example 11 but having a solution viscosity of 80 Pa.s/20° C. and dry spun).

The light fastness was found to be greatly superior in all cases, even in the samples which had been treated under harsh brightening conditions, while the "aromatic" polyurethane urea elastanes showed severe yellow and brown discolouration.

Brightening Methods 1. 80 minutes at 100° C. in water, liquor 1:30
2. Peroxide bleach:
   $MgSO_4 \cdot 7 H_2O$: 0.2 g/l
   Levapon AN fl: 0·5 ml/l Water glass: 2 ml/l
H$_2$O$_2$ 35%: 6 ml/l The following elastane solutions were prepared in addition:

| Example 13 |
| --- |

Preparation of prepolymer (50° C., 75 min, 5 ml Desmorapid ® Z, 2.56% NCO solids content):

| | Polyester (as described in Example 1) | cic,cis-dicyclohexyl-methane-4,4'-diisocyanate | trans-1,4-cyclo-hexylene diiso-cyanate | DMAC |
| --- | --- | --- | --- | --- |
| a) | 500 g | 41 g | 48.1 g | 252.5 g |
| b) | 200 g | 16.4 g | 19.3 g | 101 g |

Chain lengthening by the carbamate process (solids concentration 22%):

| Prepolymer | Ethylene diamine | Chain terminator | Solvent (222 g DMAC + LiCl) | | Viscosity $\eta$: (Pa.s) |
| --- | --- | --- | --- | --- | --- |
| 100 g a) | 1.36 g | 0.34 g of di-ethylamine | 3% LiCl in DMAC | 24.8 | 1.09 |
| 100 g a) | 1.33 g | 0.199 g of TMD | 1% LiCl in*) DMAC | 15.1 | 0.80 |
| 100 g a) | 1.33 g | 0.2 g of 1-amino-3,3,5-tri-methyl-cyclo-hexane | 1% LiCl in*) DMAC | 39.4 | 0.88 |
| 100 g b) | 1.37 g | without chain terminator | 1% LiCl in DMAC | 101.9 | 1.11 |

*) when the preferred chain terminators were used, the LiCl content could be reduced to one-third of the usual quantity since the solubility of the elastomers was substantially improved.

Blankophor BA fl: 0.7%
Blankophor DCB ultraf: 0.2%
80 minutes at 90° to 95° C.
liquor 1:30
3. Bleach:
MgSO$_4$·7 H$_2$O: 0.2 g/l
Levapon AN fl: 0.5 ml/l
Water glass: 2 ml/l
H$_2$O$_2$ 35%: 6 ml/l
Blankophor BA fl: 0.7%
Blankophor DCB ultraf: 0.2%
80 min at 90° to 95° C.
liquor 1:30
4. Acid brightening:
Blankit 1N: 2 g/l
Calgon T: 2 g/l
Diadavin EWN 200%: 0.5 g/l
Blankophor Cl fl: 0.5 g/l
40 min at 80° to 85° C.
acidified with acetic acid pH 4
liquor 1:30
5. Acid brightening:
as under 4.
80 min at 90° to 95° C.
Blankophore ® of Bayer AG
Diadavin ® of Bayer AG
Calgon T ® of Benckiser
Levapon ® of Bayer AG
Blankit ® of Bayer AG Assessment of resistance to nitrogen oxide by exposure to hot N0$_2$ gases (test for stability under the action of noxious gases)

Knitted hoses were produced from the elastane threads of Examples 2 and 5 (elastomers according to the invention) and Example 11 (comparison example containing MDI) and subjected to the NO$_x$ test conditions.

The results show a greatly superior fastness to NO$_x$ of the unstabilized elastomers according to the invention compared with unstabilized elastane based on MDI.

Films were produced from the elastane solutions of Example 13 (elastanes according to the invention) and Example 11 (comparison example with MDI) and subjected to the NO$_x$ test conditions.

The measurements carried out again show greatly superior NO$_x$ fastness of the unstabilized elastanes according to the invention compared with that of the unstabilized elastane based on MDI.

What is claimed:

1. Process for the production of segmented polyurethane urea elastomers based on relatively high molecular weight dihydroxy compounds, aliphatic and/or cycloaliphatic diisocyanates and diamines and chain terminators optionally carried out in the presence of solubilizing agents, and their shaping into threads and films by conventional processes wherein for a first stage, (a) a relatively high molecular weight dihydroxy compound having molecular weights of from 1000 to 8000, (b) with the addition of 0–15 mol %, based on a), of low molecular weight dihydroxy compounds having molecular weights of from 62 to 399, and (c) a mixture of diisocyanates in molar quantity of from 1.4 to 2.5 times the molar quantity of (a+b) comprising (c1) from 30 to 85 mole %, based on the diisocyanates put into the process, of trans-1,4-cyclohexylene diisocyanate and (c2) from 70 to 15 mol % of other aliphatic or cycloaliphatic diisocyanates, are reacted (d) in the presence of 0.002 to 0.5% by weight, based on a) of catalyst selected from the group consisting of tin catalysts and diazabicyclo octane, (e) either solvent free or in solvents which are dichlorobenzene or highly polar amide solvents comprising dimethyl formamide, dimethyl acetamide, dimethyl sulfoxide or N-methyl pyrrolidone, to produce an isocyanate prepolymer having an NCO content, based on the solid content, of from 1.5 to 3.5% by weight and this isocyanate prepolymer is reacted in a second stage with or without further dilution with said highly polar solvents, with solutions of (f-g) in said highly polar solvents, of
(f1) at least 50 mol % of other aliphatic and/or cycloaliphatic diamines and
(g) from 0 to 5 mol % of monofunctional chain terminators
(h) in the presence of from 0.1 to 10% by weight of solubilizing agents in the form of salts based on the polyurethane urea solids content, 2. Process according to claim 1, characterised in that the diisocyanates c) used consist of a mixture of 30 to 85 mol % of trans-1,4-cyclohexane diisocyanate and 70 to 15 mol % of hexamethylene diisocyanate and/or 4,4'-dicyclohexylmethane diisocyanate.

3. Process according to claim 1, characterised in that the catalysts d) used are dibutyl tin dilaurate.

4. Process according to claim 1, characterised in that the aliphatic diamines used are ethylene diamine or mixtures of ethylene diamine and at most 50 mol % of other, aliphatic or cycloaliphatic, diamines.

5. Process according to claim 1, characterised in that the chain lengthening reaction is carried out in the presence of salt type solubilizing agents based on lithium salts of inorganic acids or organic $C_1$ to $C_8$ carboxylic acids.

6. Process according to claim 1, characterised in that the solubilizing agent is lithium chloride.

7. Process according to claim 1, characterised in that the monofunctional chain terminator used consists of 0.1 to 5 mol % of compounds corresponding to the following formulae:

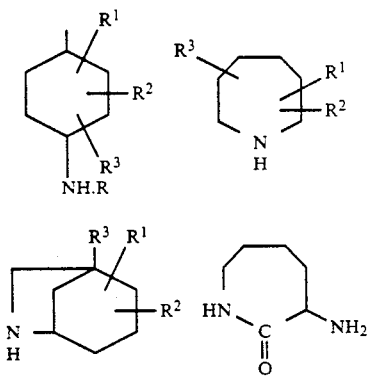

wherein
R=H, $C_1$ to $C_4$ alkyl or cyclohexyl and
$R^1$, $R^2$ and $R^3$ denote straight chain or branched chain $C_1$ to $C_4$ alkyl groups but at least one of the groups $R^1$, $R^2$, $R^3$ must be alkyl when R is not alkyl or cycloalkyl.

8. Threads and films according to claim 1, characterised in that from 0.1 to 3 mol % of 1-amino-3-methyl-cyclohexane, 1-amino-2-methyl-cyclohexane or 1-amino-3,3,5-trimethyl cyclohexane

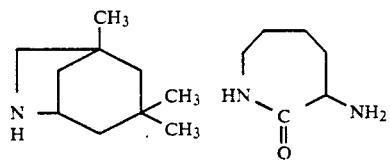

are incorporated therein as chain terminators.

9. Films according to claim 8, characterised in that they have a heat distortion temperature (HDT) of at least 170° C. and a hot breaking time (HRZ) of at least 7 sec.

10. Process as claimed in claim 1 wherein the dihydroxy compound a) has a molecular weight from 1500 to 4000.

11. Process as claimed in claim 1 wherein the amount of c1) is from 50 to 80 mol %.

12. Process as claimed in claim 1 wherein the amount of c2) is from 50 to 20 mol %.

13. Process as claimed in claim 1 wherein the amount of catalyst d) is 0.005 to 0.10% by weight of a).

14. Process as claimed in claim 1 wherein the products are shaped by dry or wet spinning.

15. Process as claimed in claim 7 wherein the amount of chain terminator is 0.1 to 3 mol %.

16. Segments polyurethane urea elastomers according to claim 1 which contain
(a) relatively high molecular weight polydihydroxy compounds having molecular weights of from 1000 to 8000,
(b) 0 to 15 mol %, based on a) of low molecular weight diols with molecular weights from 62 to 399
(c) mixtures of diisocyanates based on 30 to 85 mol% of trans-1,4-cyclo-hexylene-diisocyanate and 15 to 70% by weight of other aliphatic and/or cycloaliphatic diisocyanates,
(f) aliphatic diamine chain lengthening agents based on at least 50 mol % of ethylene diamine and optionally up to 50 mol % of other aliphatic or cycloaliphatic co-diamines,
g) and 0.1 to 5 mol % of monofunctional chain terminators, having inherent viscosities of $\geq 0.80$ g/l determined in dimethyl acetamide at 30° C. as 0.5% solution and having heat distortion values $\geq 170°$ C. and hot breaking times of the threads of $\geq 7$ seconds.

* * * * *